United States Patent
Griffin et al.

(10) Patent No.: US 8,711,474 B2
(45) Date of Patent: Apr. 29, 2014

(54) MODULAR MICROSCOPE CONSTRUCTION

(75) Inventors: Michael Griffin, El Cerrito, CA (US); Daniel Yue Man Chu, Hercules, CA (US); Tom McCollum, Berkeley, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 645 days.

(21) Appl. No.: 12/825,067

(22) Filed: Jun. 28, 2010

(65) Prior Publication Data

US 2010/0328766 A1    Dec. 30, 2010

Related U.S. Application Data

(60) Provisional application No. 61/220,776, filed on Jun. 26, 2009.

(51) Int. Cl.
  *G02B 21/06*  (2006.01)
  *G02B 21/36*  (2006.01)

(52) U.S. Cl.
  CPC ........... *G02B 21/06* (2013.01); *G02B 21/365* (2013.01)
  USPC ........................................ 359/385

(58) Field of Classification Search
  USPC ................................. 359/368–398
  See application file for complete search history.

(56) References Cited

U.S. PATENT DOCUMENTS

| | | | | |
|---|---|---|---|---|
| 4,284,327 A * | 8/1981 | Kraft et al. | | 359/388 |
| 4,585,315 A | 4/1986 | Sincerbox et al. | | |
| 5,048,941 A * | 9/1991 | Hamada et al. | | 359/368 |
| 5,585,964 A * | 12/1996 | Schalz | | 359/368 |
| 5,668,660 A * | 9/1997 | Hunt | | 359/380 |
| 6,038,320 A | 3/2000 | Miller | | |
| 6,452,625 B1 * | 9/2002 | Kapitza | | 348/80 |
| 7,167,303 B2 * | 1/2007 | Gilbert | | 359/368 |
| 7,286,286 B2 * | 10/2007 | Obuchi | | 359/385 |
| 8,189,897 B2 * | 5/2012 | Leidenbach | | 382/133 |
| 8,243,365 B2 * | 8/2012 | Tsuchiya et al. | | 359/390 |
| 2005/0111086 A1 * | 5/2005 | Knoblich et al. | | 359/368 |
| 2005/0201441 A1 * | 9/2005 | Seyfried et al. | | 372/69 |
| 2007/0097493 A1 | 5/2007 | Sieckmann | | |
| 2009/0129032 A1 * | 5/2009 | Liedtke et al. | | 361/730 |
| 2009/0165123 A1 | 6/2009 | Giobbi | | |
| 2011/0080638 A1 * | 4/2011 | Feger | | 359/385 |

OTHER PUBLICATIONS

International Search Report and the Written Opinion of the International Searching Authority, or Declaration dated Jul. 2010.
Office Action mailed Dec. 16, 2013 in Canadian Patent Application No. 2,766,102, 3 pages.

* cited by examiner

*Primary Examiner* — Derek S Chapel
*Assistant Examiner* — Jeffrey Madonna
(74) *Attorney, Agent, or Firm* — Kilpatrick Townsend & Stockton LLP (57) ABSTRACT

A system, apparatus and method for using modular microscopes is disclosed. Connecting the housings of the individual microscope modules provide the structural framework of the modular microscope. Furthermore, the modular microscope can include specialized software, the distribution and use of which can be controlled using security keys or identifiers stored on one or more of the microscope modules. The security keys and identifiers can be based on calibration data associated with the physical, electrical, or optical properties of one of more of the modules. The illumination modules disclosed provide for selectable wavelengths and controllable levels of output illumination for both bright field and dark field illumination.

8 Claims, 6 Drawing Sheets

MODULAR MICROSCOPE CONSTRUCTION

CROSS-REFERENCES TO RELATED APPLICATIONS

This application claims priority to U.S. Provisional Patent Application No. 61/220,776, filed on Jun. 26, 2009, entitled Modular Microscope Construction. This provisional patent application is incorporated herein by reference in its entirety for all purposes.

BACKGROUND OF THE INVENTION

Current microscopes do not allow for manufacturers or users to customize the microscope system to the exact needs of the user. Most low cost solutions incorporate a housing or structural backbone onto which the components of the microscope are permanently built. In such microscopes, manufacturing and, consequently, purchasing customized microscopes can be extremely expensive. Once the custom microscope is manufactured according to contemporary designs and methods, changing or adding to the configuration of the custom microscope is often prohibitively expensive and impractical. As such, most current microscopes, if customized at all, are purchased and used for a single application.

In addition, digital microscopes currently on the market have no way to control how users use the digital microscope or the images produced by the digital microscope. Such limitations prevent manufacturers from customizing low cost off-the-shelf turnkey digital microscopes and controlling how the digital microscopes are used by a client computer or other computing device or subsequently protecting the images captured using the digital microscope. Additionally, manufacturers and users alike have no automatic way of coupling digital rights management to the images produced with their digital microscopes. As such manufacturers have no way to encourage or force users to purchase and use software and hardware in combinations intended by the manufacturer or seller.

Embodiments of the present invention address these and other deficiencies.

BRIEF SUMMARY OF THE INVENTION

In one embodiment of the present invention, a modular microscope system comprises a control module, an imager module, a lens module and an illumination module. Each of the modules includes a distinct and separate structural frame. The individual modules can be manufactured by one or more entities, but can be designed such that all modules are mechanically and communicatively compatible with one another or at least the other modules to which they are intended to be coupled. For example, the control module and the imager module can be coupled together using a combination of mechanical and electronic couplers or sockets.

The control module can include a security module, an application module, a focus control module, illumination control module, a calibration module, an imager communication module, a power module, and a communication module. In some embodiments, the control module is mechanically and communicatively coupled to the imager module. Control module can power and control the imager module. In yet other embodiments, the lens module can be mechanically coupled and aligned to the imager module. The lens module can be controlled by the control module by signals relayed through the imager module. Illumination module can be mechanically coupled and aligned to the lens module. Illumination module can be controlled and powered by electrical signals from the control module relayed through the lens module and the imager module. In alternative embodiments, the illumination module is controlled or powered by one or more module external to the modular microscope.

In another embodiment, the control module can include a second security module. The second security module of the second security module can manage how and when an image captured with the modular microscope is used. The second security module can insert code or a digital water mark into images captured with the modular microscope to restrict access to the images. The restricted access to the images can be accomplished in two ways. In one embodiment, the images can only be opened, viewed or manipulated by a computer system that is connected to the modular microscope with a valid or registered microscope identifier. In another embodiment, the images can only be opened with the application resident in the modular microscope. In such embodiments, the copy of the application stored in the microscope can act as the microscope identifier. Applications resident in the modules of the modular microscope can be adapted be run on either a processor in one of the modules of the modular microscope, or by an external general use computer.

In yet another embodiment, the lens module can have a motorized focus module controlled by the control module or external general use computer to control or correct the focus of the lens module. In other embodiments, the illumination module comprises LEDs that can be configured to provide dark field or bright field illumination. The illumination module can switch between dark field and light field illumination using electronic switch. In other words, the illumination module can switch between dark field and light field illumination with no moving parts, and thus no extraneous physical vibrations to the illumination module or the modular microscope.

DETAILED DESCRIPTION OF THE INVENTION

Figure 1:
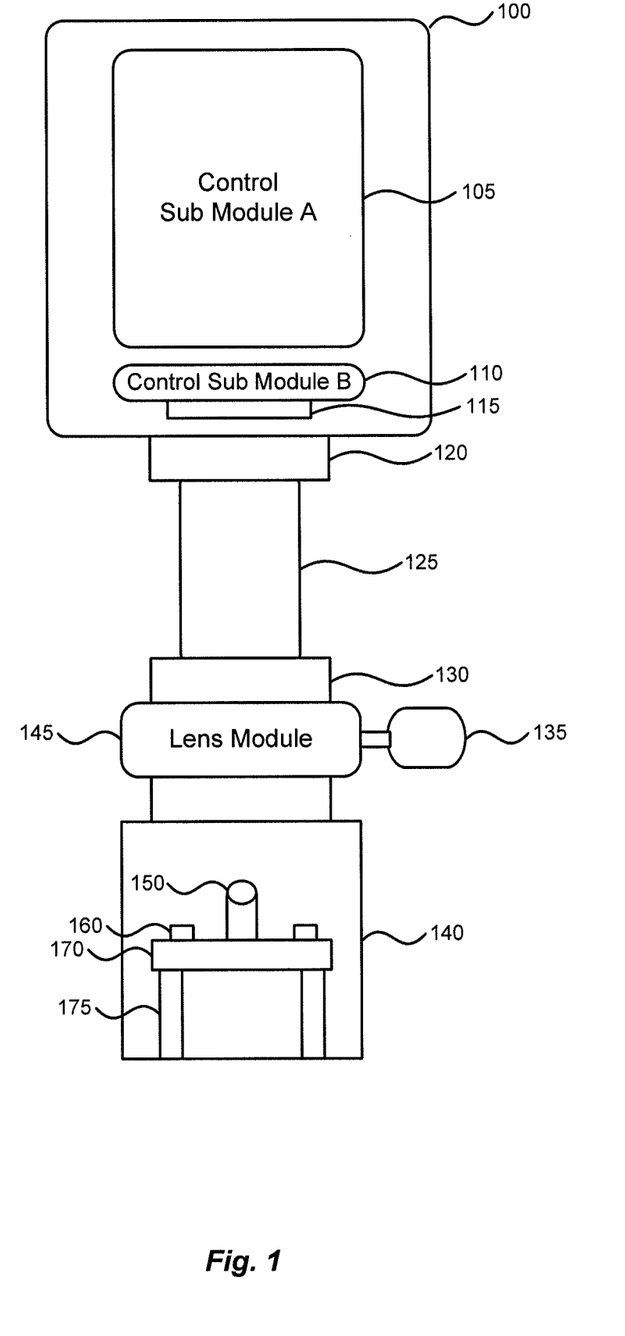
FIG. 1 is a schematic drawing of a modular microscope system according to one embodiment of the present invention.

FIG. 1 depicts a schematic of a modular microscope according to one embodiment of the present invention. The modular microscope can include several main components; control module 100, lens module 125 and illumination module 140 and imager module (not shown).

In FIG. 1, one possible embodiment of the control module is depicted with control sub module A 105 and control sub module B 110. In other embodiments, the control module 100 can include these and more control sub modules. In such embodiments, the presence of multiple control sub modules allows various functionalities of the control module 100 to be isolated or assigned to one or more of the control sub modules. This is particularly helpful for isolating the security, operational and other functionality amongst the various control sub modules.

Although the modules of modular microscope depicted in FIG. 1 will be described as an exemplary embodiment, each module including specific elements and capable of specific functions, one of ordinary skill in the art will realize that the various elements and functions can be included in or carried out by any of the modules, or in some other separate module integral to or separate from the depicted modules, without departing from the spirit or scope of the present invention.

The modules can be connected at coupling points 120 and 130. The specific details of each of the individual modules and coupling points will be discussed in greater detail herein. To provide a context for the description of the various embodiments of the present invention, an overview of the invention will be described.

The modular nature of the modular microscope provides for a number of features and advantages. For instance, the modular nature of the modular microscope allows various pre-designed or pre-manufactured microscope modules to be selected and assembled to customize modular microscopes for various applications. For example, control module 100 can be designed to include a specialized imaging device 115 or specific optical filters for detecting and imaging various spectra of illumination or radiation. For example, the imaging device and optical filters can be selected so as to equip the modular microscope for fluorescent detection of subject specimens. In addition, lens module 125 can be specifically designed to have particular numerical aperture or depth of field depending on the intended specimens. Similarly, illumination module 140 can be designed and outfitted to illuminate subject specimens with a particular band of wavelengths and at specific angles and intensity of illumination. For example, it is possible to select light sources appropriate for inducing fluorescence in specimens so that modular microscope can be used for fluorescent detection.

The assembled modular microscope of FIG. 1 can be connected to and controlled by a general use computer or other computing device. Control module 100 can include software applications and drivers that can be executed by a processor. The processor can be resident in any one of the modules or can be included in a general use computer (not shown) connected to the modular microscope. In embodiments in which the processor executing the software applications and drivers stored in one of the modules of the modular microscope is a general use computer, the general use computer can either run the software applications and drivers remotely from the memory in the modular microscope or copy the software applications to its own separate memory. Various methods and protocols for sending commands to and receiving signals from the modular microscope at the general use computer include USB, serial, parallel, FireWire and other conventional and proprietary peripheral device connections.

In some embodiments, control module 100 can send or receive control signals to and from each of the other modules in the modular microscope over various connections. Such functionality can be achieved in embodiments where the processor is internal or external to the modular microscope. The control signals can travel within communication and power connections between control module 100 and the other modules of the modular microscope that can be included in the mechanical connection points 120 and 130. Alternatively, some or all of the separate modules can be communicatively connected to the control module through connections external to the mechanical connection points 120 and 130. All connections can be any suitable electrical contact connections or wired connections.

Control signals from control module 100 can be configured to control and/or power the various functions of the lens module 125, focus module 145 and illumination module 140. For example, control module 100 might receive a command from the general use computer to change the focus position of lens module 125 using focusing module 145 by activating focusing motor 135. The control module can then send the appropriate control signal and power to focusing motor 135. This will change the focal position of the lenses included in lens module 125 to better focus on a sample placed a specimen stage included in either the focus module 145 or illumination module 140. Similarly, control module 100 can send an appropriate control signal or power signal to illumination module 140 to turn on the specific light sources to produce a specific illumination output.

In some embodiments, the focus module 145 can be incorporated into the lens module 125. In other embodiments, focus module 145 can be incorporated into illumination module 140. In yet other embodiments, focus module 145 can be a separate module. In yet other embodiments, a specimen stage can be a separate module configured to hold standard microscope slides or customized to hold and process specialized sample containers in a manual or automated manner.

Once the sample is illuminated by illumination module 140 and properly positioned relative to the lens module 125, a properly focused magnified image of the subject specimen can be imaged onto the imaging device 115 of the control module 100. At this point, control module 100 can initiate an image capture sequence to use the imaging device 115 to detect and store an image of the subject specimen. In some embodiments, the image of the subject specimen is delivered to output device, such as computer monitor, in real-time to facilitate real-time observation of the subject specimen. In yet other embodiments, the modular microscope can include a display module configured to display the image of the subject specimen on the modular microscope similar to a display on a still picture or moving picture digital camera.

Various embodiments advantageously provide the ability for a manufacturer to outsource the manufacture of various modules of the modular microscope without disclosing the design specifications of the entire modular microscope to any one particular outside manufacturer. As long as the various modules comprised in the modular microscope are compatible with one another, each module can be manufactured in different facilities. Final assembly can be performed by an OEM manufacturer, the selling manufacturer, a distributor, a retailer or the end-user.

In some embodiments, the modules can be calibrated to work together in a specific ways to perform a specific functions. For example, some applications, such as counting cells, require collimated backlight at a specific distance to avoid various optical aberrations.

Since it is possible for a retailer or an end-user to conduct final assembly of the modular microscope, it is possible to design the modules to be upgraded or repaired with improved or new modules that may add additional functionality or capability to the modular microscope after the initial build or purchase. In a similar fashion, the modular microscope can be customized for an application other than the one for which it was originally assembled or purchased with the addition of newly configured or calibrated modules.

Specific details of the various components, modules, functions, and capability of the modular microscope are discussed in reference to aspects, improvements, and advantages of various embodiments of the present invention.

Modular Structural Frames

One advantage of various embodiments of the present invention over contemporary microscopes is the presence of at least one structural frame for each module of the modular microscope. Most contemporary microscopes include a singular structural housing, body or frame into which all components of the microscope are built. The singular housing or frame prevents manufacturers or users from customizing the elements of the microscope to a specific application without significant expense or engineering. For example, conventional microscopes comprise a single integrated body that holds and supports all the elements of a microscope to maintain position, orientation, and alignment. Although such microscopes provide adequate stability, they do not allow for the easy integration, substitution, or addition of necessary or alternate imagers, control logic, lenses, or light sources in a structurally sound modular system. Conventional microscopes require significant reworking or reengineering of existing designs to provide a customized solution. These and other limitations associated with so-called unibody microscopes are obviated by various embodiments of modular microscopes, so-called non-unibody microscopes, according various embodiments.

For example, the feature of each module of the modular microscope having its own distinct and separate structural frame provides a number of advantages. Firstly, the structural frame of each of the constituent modules can be a completely open, a partially open or a completely closed housing or enclosure. This flexibility of housing style allows the modular microscope to be designed to provide, complete, partial or no user access to the internal parts of each module. For example, in some applications, it is desirable for one or more of the modules to be sealed to protect the contents of the structural frame from environmental conditions or contaminants such as dust, moisture and debris that may be harmful to the internal components of the modular microscope. Keeping the lenses and other optics in the lens module free of debris is typically very important whereas keeping debris off of the electronics, not including the imaging device, is usually not a first order priority. In some embodiments, providing access to the internal parts of the modules can provide easy for easy user maintenance and cleaning of parts such as the imaging device and illumination sources in illumination module 140.

Each one of the structural frames can be made of the same material, however, there may be applications in which it may be desirable to vary the material out of which each of the structural frames are constructed. For instance, all the structural frames may be constructed of metal such as aluminum, or other appropriate metal or alloy. In other embodiments, some of the structural frames can be constructed out of metal while others can be made of plastic or other polymers. The material out of which structural frames are made can be selected to meet the environmental conditions in which the modular microscope is intended to be used. As known in the art, some materials are better suited for certain environments in which the modular microscope may be exposed to moisture, heat or chemicals. It is contemplated that the modular microscope can have various structural frames suited to act as heat sinks or to protect the internal components of each module from the environment in which it will be used. Depending on the precision of the imaging to be conducted by the modular microscope, it may be desirable to construct the structural frames out of materials with low thermal elastic constants to avoid extraneous thermal expansion and contraction and the potential misalignment or spatial focal shifts of the optics caused thereby.

The structural frames of the modular microscope can be manufactured in various ways. Various methods of milling, molding, casting, extruding and machining can be used to manufacture the structural frames precisely and cost effectively. The structural and rigidity requirements of the specific application in which the modular microscope will be used can be considered when determining which manufacturing method to use.

Couplers

The couplers or coupling points 120 and 130 connect and align various modules of the modular microscope with respect to one another. In some embodiments, the couplers can be integrated into the various modules of the modular microscope. For example, the structural frames of control module 100, lens module 125 or illumination module 140 can include integrated couplers that are compatible with the other modules. Couplers 120 and 130 can also be separate couplers such as focus tubes of different lengths depending on the requirements of the application for which the microscope will be used. As used herein, coupler 120 and 130 can refer to either a coupling mechanism integrated into one or more of the modules or a separate coupler used to couple the separate modules together.

In accordance with various embodiments, as long as the couplers or mounts for the couplers in the structural frames are compatible with one another, the various modules can be manufactured independently of one another. Couplers 120 and 130 can be any suitable proprietary or standard connection lens mount or other mechanical coupling means. In some embodiments, it is desirable for coupler 120 to mechanically and communicatively link lens module 125 to control module 100, as well as align the lens system in lens module 125 with respect to the imager device 115 on control module 100. Similarly, coupler 130 can be configured to mount and align lens module 125 to illumination module 140.

Various types of mounting hardware can be used as couplers. Either industry-standard or proprietary optical mounts can be used to align the lens module 125 with respect to the imaging device 115 in control module 100. For example, standard T-Mounts, C-Mount, D-Mount, CS-Mount, Micro Four-Thirds type mounts, Four-Thirds, M42 lens mounts, or magnetic coupling mounts can be used. One of ordinary skill in the art will recognize that any type of suitable lens mount can be used to couple and align lens module 125 to the imaging device on control sub module 2 110. In various embodiments, the couplers can include communication and power connections to carry control and power signals among the various modules or means to recognize the other modules being connected.

Methods of Assembling

Figure 2:
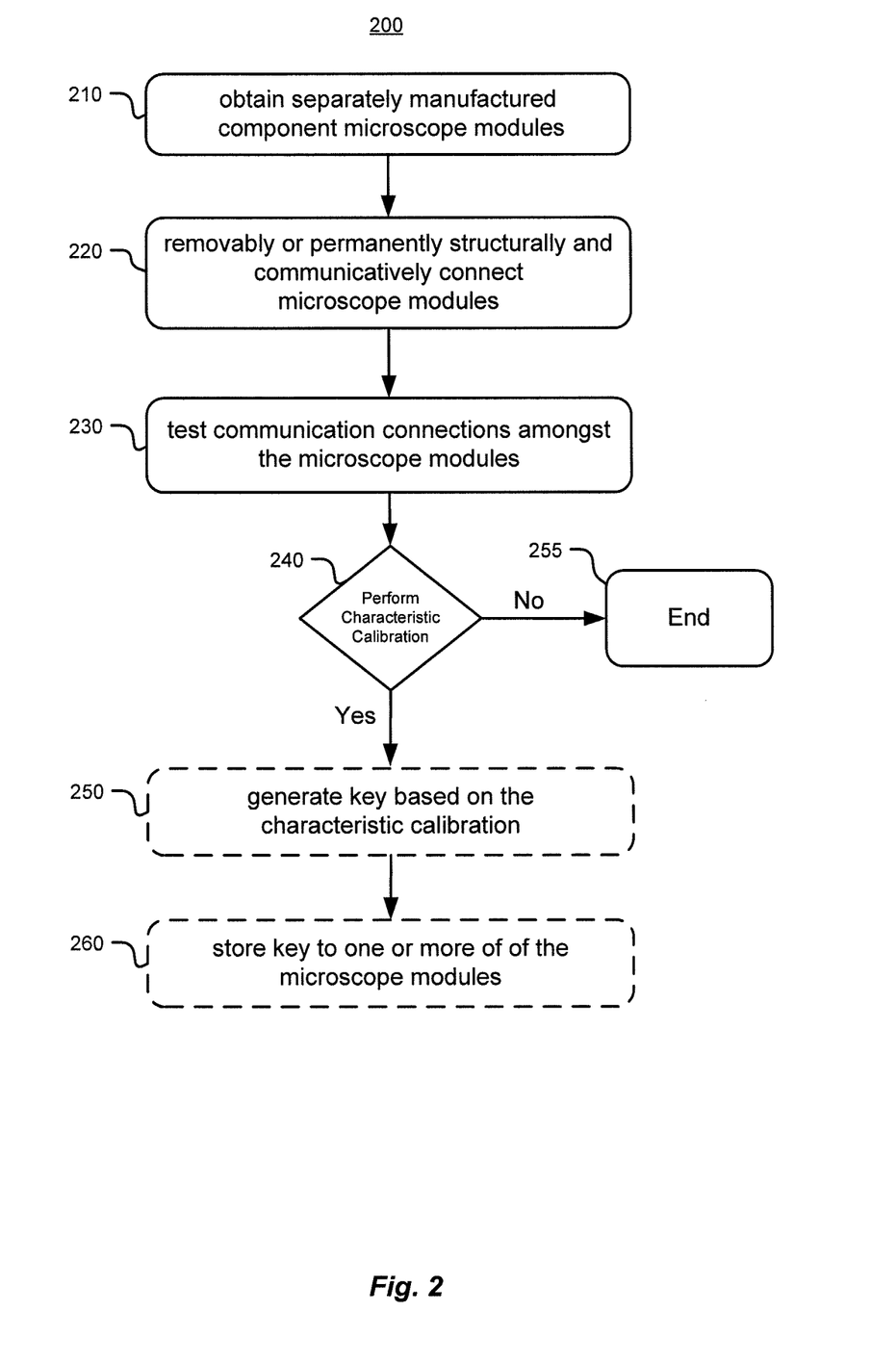
FIG. 2 is a flowchart of a method for assembling a modular microscope according to one embodiment of the present invention.

FIG. 2 is a flowchart of a method 200 for assembling a modular microscope or attaching additional or customizable modules to a fully or partially assembled modular microscope according to various embodiments of the present invention. Initially, the method begins at step 210 in which an assembler, manufacturer, retailer or end user can obtain separately manufactured component microscope modules as discussed above in reference to FIG. 1 and below in reference to FIG. 3. Obtaining the separately manufactured component microscope modules can include manufacturing the modules, purchasing the modules, assembling the module or any combination thereof. Furthermore, the modular nature of the microscope modules allows them to be manufactured by separate entities, thus allowing for outsourcing or contract manufacturing to entities that can best or most efficiently produce the specific modules.

By splitting up the manufacturing process for at least some of the component microscope modules amongst various manufacturers, it is possible to maintain secrecy and confidentiality of the any or all of the internal configurations, components, logic, programming, etc., of each individual module and the assembled modular microscope from any single manufacturer. As such, it is possible to use specific distributed manufacturing schemes to maintain trade secrets or to protect the unauthorized distribution or copying of designs, logic or application software.

One or more of the modules can be manufactured to include two or more sub modules or various modules can be manufactured in groups or clusters. In such embodiments, each of the modules or sub modules can be manufactured by a specific entity and then sent to an assembler for final assembly. Any one of the manufacturers or assemblers can be the entity that obtains the separately manufactured component microscope modules in step 210. Alternatively, the assembler can be an entity separate from the any of the manufacturers.

Regardless of the entity that obtains the separately manufactured component microscope modules, the modules can then be removably or permanently assembled to be structurally and/or communicatively connected to one or more of the other component microscope modules in step 220. Once the entire modular microscope is fully assembled, it can be tested in step 230.

The testing step 230 can include testing the communication and control connections amongst the microscope modules to ensure that the control module 100 can communicate or control each of the other modules through the communication or control connections that are routed, either internally or externally, in or around each of the microscope modules through couplers 120 and 130.

The testing step can include various subtests for testing and verifying the functionality of each of the sub modules. The testing step can include running machine readable data stored in memory in control module 100 using, control sub module A 105 or control sub module B 110 or some other processor internal or external to the modular microscope, that includes code executable on processor to implement the testing step 230. In some embodiments, the testing step can include a characterization routine that can be run at the time of initial assembly or at any thereafter. The characterization routine can test and measure the individual or combined characteristics of the microscope modules, such as the physical or electronic characteristics of the imager, including signal-to-noise levels or dead or hot pixels. In other embodiments, the optical properties of the lens module, such as optical aberrations, defects, performance, etc., can be measured and stored as part of the characterization routine.

The testing step can also include a routine for writing or otherwise storing the results of the tests in one or more of the of the microscope modules. The stored testing results can then be referenced whenever the modular microscope is connected to an external processor or computer or otherwise activates for use. In some embodiments, the results of the characterization routines can be used to generate a key that must be used or presented in order to access any information stored on one more of the microscope modules. The key can be used or presented by connecting the modular microscope to a computing device and reading the key from memory on the modular microscope.

In other embodiments, the key based on the characteristics may be used to limit or restrict use of any digital images captured using the particular configuration of microscope modules in the modular microscope. For example, the key can be used to generate a digital watermark in the images against which the key can be compared before allowing a user to access and use any software or application stored on or run from one or more the microscope modules to access, open, read, manipulate, transfer, analyze or save images captured using one or more of the microscope modules. These and other security aspects based on testing results and microscope module characteristics will be discussed in more detail below in reference to methods for using a modular microscope.

In some embodiments, testing step 230 can include a flag that can be set either on or off. If the flag is one, running routine for the testing step 230 will initiate a characteristic calibration routine in step 240. If characteristic however should flag is not indicated, i.e. the user either selects to skip the calibration or internal flag has not been set in the test routine, the process ends at step 255. However if the characteristic calibration flag is set to yes or on, calibration of the modular microscope can occur according to various schemes for calibrating the various modules of the modular microscope. If the flag is set to no, then the process ends at step 255.

The characteristic calibration procedure can include measuring a combination of the performance characteristics of each of the microscope modules in a particular modular microscope. For instance, electrical properties of the imager can be measured in combination with the optical characteristics of the lens module while they are used to image a specific test target. One of ordinary skill in the art will realize that the requisite or desired calibration schemes will depend on the intended end use of the modular microscope. For example, if the modular microscope is to be used in florescent or a dark field cellular counting, and the imager may need to be operated with relatively high gain voltages, thus producing higher noise to signal ratios, and the calibration routine would need account for the fact that the imager will be delivering a relatively noisy signal during normal operation. Similarly, if a particular lens module with a large numerical aperture is substituted in for a particular lens module with a smaller numerical aperture, it may be desirable to execute the characteristic calibration to account for the greater light collecting power of the lens module with a large numerical aperture.

In some embodiments, the characteristic calibration can be used to calculate a security key. The security key can be generated based on performing a hash operation on one or more characteristic values for all or some of microscope modules in the modular microscope. The generation of the security key based on the characters a calibration in step 250 can be an optional step according to some embodiments of the present invention. Next, if the key is generated, then the can be optionally be stored in one or more the microscope modules in step 260. In various embodiments, the key can be stored on control module 100, the lens module 145 or the illumination module 140 or any other module that includes a computer readable and writable memory.

Control Modules and Control Sub Modules

As shown in FIG. 1, control module 100 can comprise control sub module A 105 and control sub module B 110. Control sub module A 105 can further include a plurality of sub modules. As depicted in the system level schematic in FIG. 3, control sub module A 105 can include a security module 310, an application module 315, a focus control module 320, an illumination control module 325, a calibration module 330, an imager communication module 335, a power module 340, a communication module 345 and a driver module 360. However, in various embodiments, any combination of the sub modules in control sub module 105 can exist or be incorporated into more or fewer components. Control module 100, depicted as control sub module A 105 and control sub module B 110, and any of the constituent sub modules can be any combination of software or hardware modules. In some embodiments, sub modules included in control sub module A 105 can be computer readable software code stored on a computer memory in control sub module A 105 operable to be executed on a processor included in control sub module A 105 or on a general use computer.

Figure 3:
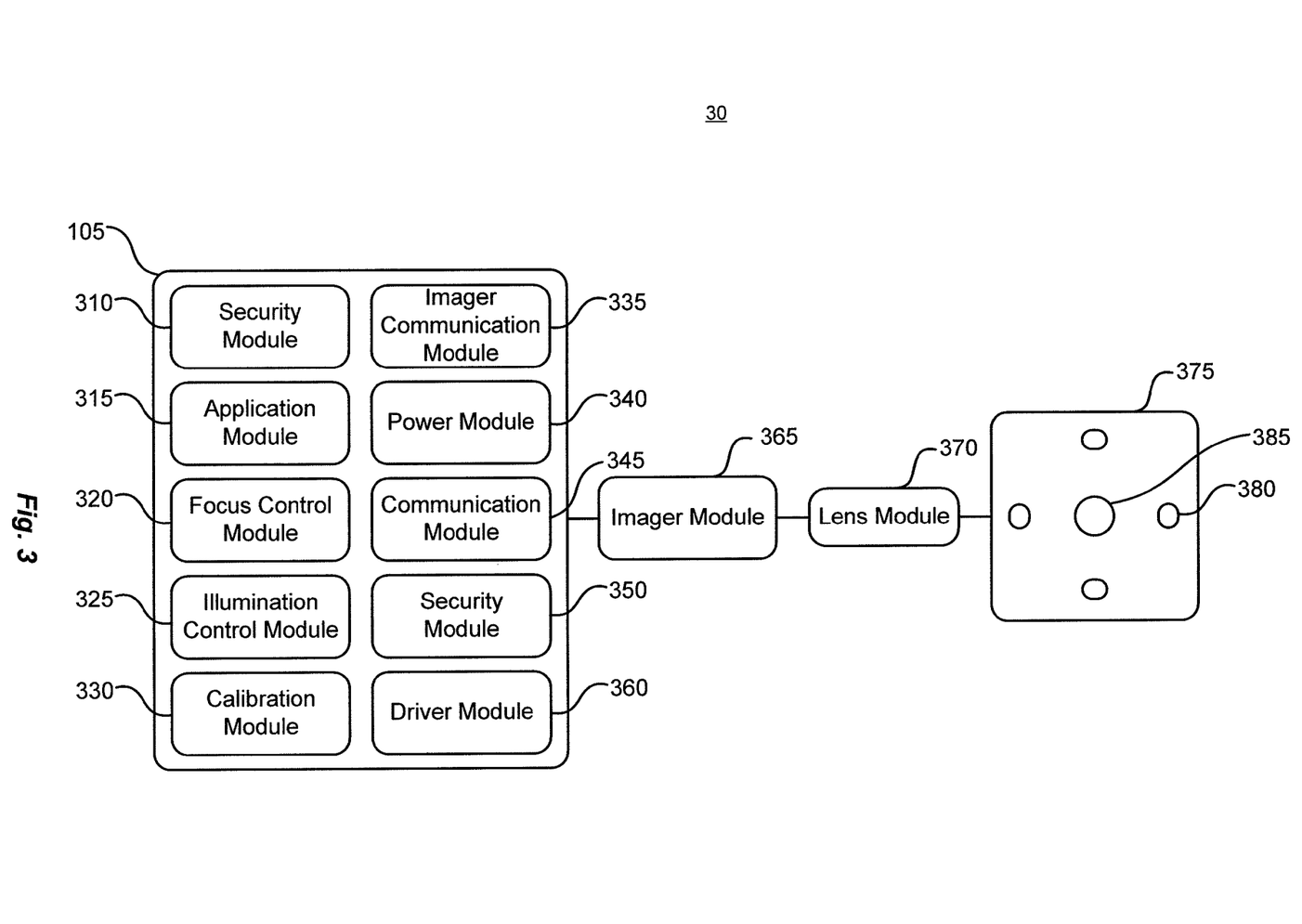
FIG. 3 is a schematic drawing of a modular microscope according to one embodiment of the present invention.

As shown in FIG. 1, control sub module B 110 can include an imaging device 115 such as a CCD or CMOS imager chip into an imager module 365. Control sub module A 105 and control sub module B 110 can be mechanically and communicatively connected with electrical couplers or sockets. In alternative embodiments, control sub module A 105 and control sub module B 110 can be incorporated into a single module.

Control sub module B 110 can include a printed circuit board (PCB) and a memory containing a calibration or defect table that can be used to compensate images captured with the imaging device. Imaging device 115 can be surface mounted or socket mounted on the PCB in control sub module B 110. The information in the calibration or defect table can be communicated to a processor to be used in image processing to compensate for dead or damaged pixels, drift in photosensitivity across the imaging device, color sensitivity differentials across the imaging device and other imaging device specific information necessary to produce a high-quality image.

Control sub module A 105 can have a processor. In such embodiments, the processor can execute any or all protocols or applications contained in control sub modules A 105, control sub module B 110 such as stored in the application sub module 315 in FIG. 3. In some embodiments, the processor in control sub module A 105 can read, process and execute applications and drivers stored on any one of the modules of an assembled modular microscope.

In other embodiments, control module 100 can be coupled to an external general use computer. In such embodiments, computer programs embodied in computer readable code stored on computer readable medium in control module 100 or other modules can be configured to be executed on the external general use computer. In some embodiments, the computer programs can be executed directly from the computer readable medium in the control module 100 by the external general use computer. In other embodiments, the programs can be copied temporarily to an external memory and executed from that location. In such embodiments, the ability of an external processor to execute the program will depend on whether the modular microscope is connected to the external processor. In such embodiments, the modular microscope, either as a whole or in parts, acts as a security dongle that is physically required in order to run certain programs and access certain drivers. The security aspects of the present invention to be discussed in detail below.

Security Module

As mentioned above, in various embodiments, control module 105 can include a plurality of sub modules. These sub modules can include a security module 310, an application module 315, a focus control module 330, illumination control module 325, the calibration module 330, an imager communication module 335, a power module 340, the communication module 345, a second security module 350 and a driver module 360. It will be apparent to one of ordinary skill in the art, that two or more of the modules in control module 105 can be integrated into each other so that control module 105 can comprise fewer sub modules.

As shown in FIG. 3, control module 105 can include a security module 310 that acts like a security dongle. Such configurations can prevent unauthorized use of programs contained in the application module 315 included in control module 105. Just like a security dongle, security module 310 can require that the modular microscope be wholly or partially present and connected to the external general use computer for the general use computer to be allowed to use any applications stored in application module 315 or elsewhere in the modular microscope or view images captured with the imaging device included on imager module 365 of modular microscope. For example, security module 310 can include a key generated using the characteristic calibration results obtained from the initial testing of the modular microscope as described in reference to FIG. 2 above.

Also as briefly described above, electrical, electronic, mechanical or optical characteristics of the microscope modules can be measured and used, either individually or in combination with one another, to generate a security key that can be stored in one of the security modules 310 or 350 in control module 105. In some embodiments, a imager module 365, lens module 370 or illumination module 375 can be changed out or moved from one control module to another, but if the specific control module 105 is either removed or disconnected, then access to or use of any software packages paired with or resident on the control module 105 can be limited and/or prohibited. In this way, the modular microscope can act as its own security device to prevent unauthorized users from copying or using programs contained in application module 315 or using, copying, saving, viewing, processing, or otherwise manipulating images captured with the modular microscope. Such embodiments allow for the restrictive pairing of application software to a particular modular microscope or a particular module of the modular microscope. Thus, in order to use any of the software paired with or resident on a microscope module, that microscope module must either be present are actually connected to a general-purpose computer for it to be used to run and/or execute the software.

Security module 310 can be configured to allow customizable levels of security with respect to use of programs in the application module 315 and images captured with the imaging device in imager module 365. In some embodiments, this can include allowing users to register a family of modular microscopes and modular microscope components with one another so that if any one of the family of modular microscopes are modular microscope components are connected to a computer system, a computer system will be authorized to use secured programs and images associated with that family of modular microscopes and modular microscope components. The registration can occur at the time of manufacture or sale with the programming of EEPROMs in the separate modules or sub modules.

For example, a research lab may purchase some quantity of modular microscopes. The microscopes may all be the same configurations or they can be a mix of various configurations for different applications. At the time of manufacture or the time of sale, the control module 100, or some other module in the modular microscopes, can be recorded and configured as being part of the quantity, or family, of microscopes now belonging to the lab. As such, images captured with one of the microscopes in the family of microscopes can be viewed by any user using a computer connected to another microscope belonging to the same family. In this way, the lab that buys a family of microscopes can use a computer connected to any one of those microscopes to open, view or manipulate images captured by another microscope in the family. In some embodiments, the manufacturer, reseller or end-user can add more modular microscopes to the family by configuring newly purchased modular microscopes or modules to family by either programming EEPROMS or identifying other modular microscopes or modules to the newly acquired modules.

In various embodiments, security module 310 can control access to control module 105 through communication module 345. The access to control module can be restricted by pass codes which are required for security module 310 to grant an external computer access to the control module via communication module 345. In various other embodiments, security module 310 can apply security encryption or encoding to images captured by imager module 365. In other embodiments, the second security module 350 can apply security encryption or encoding to images captured by images captured by imager module 365. In such embodiments, security module 310 or second security module 350, can encode each image captured by imager 365 with a microscope specific encryption code for security so that the images can only be viewed when control module 105 is connected to the device being used to view the images.

In related embodiments, security module can encode each image captured by imager 365 with a microscope or microscope family specific encryption code or security code so that images captured with imager module 365 can only be used or viewed when the device being used to electronically access the images is connected to control module 105 or another control module of the same family. Such embodiments allow an individual or entity to buy one or more modular microscopes and use images from any one of the microscopes they own to view images captured with another microscope that they own. In various embodiments, the digital rights management of images captured with previously owned modular microscope control modules 105 can be expanded so that images can be backward and forward compatible with new and old modular microscopes.

In various embodiments security module 310 can contain an identifier to be used in security protocols. In such embodiments, the identifier can be communicated to communication module 345 such that the entire control module 105, or some combination of control module 105 with another module of the modular microscope system, can be used as security dongle. Such embodiments can require that any images captured using the modular microscope system to have the modular microscope system with the correct security module 310 or other sub module to be connected to a computer attempting to view or use images captured with the specific modular microscope system. In various embodiments, the identifier contained in security module 310 can be encoded into any images captured with the specific modular microscope system.

Application Module

In various embodiments, application module 315 can have one or more applications. The applications resident within application module 315 can include, but not limited to, encoding and decoding applications, security verification applications, image manipulation applications and calibration applications. In various embodiments, the applications included in application module 315 can be configured to be executed on a general-purpose computer or on a processor included in control module 105. In various embodiments, application module 315 can be a ROM in control module 105. In various other embodiments, application module 315 can be an EEPROM or some other writable memory that can be programmed or updated in the field by either the consumer or an authorized vendor.

Focus Control Module

Various embodiments of control module 105 can include a focus control module 320. In such embodiments, the control module 105 controls any motorized focus mechanism of control module 105, imager module 365, lens module 370 or illumination module 375. Focus control module can utilize any suitable communication protocol to actuate the servers or motors 135 that control the focus of lens module 370 relative to imager module 365 and illumination module 375. One of ordinary skill in the art will recognize the various communication and control protocols can be used without deviating from the spirit or scope of the present invention.

Illumination Control Module

In various embodiments, control module 105 includes an illumination control module 325. In such embodiments, the illumination control module 325 can have drivers or software to control the power source and control circuits on imager module 365. In various other embodiments, illumination control module can have one or more calibration tables that correlate voltage or current levels of the illumination sources to calibrated illumination configurations and output levels. The calibration table can be copied from a memory in the illumination module 375 illumination control module 325 can use the calibration tables to control whether or illumination module 375 illuminates a subject with bright field illumination, dark field illumination or a combination of both. Additionally the illumination control module 325 can use the calibration tables to control the intensity of the LEDs or other illumination sources located on illumination module 375. In various embodiments, the illumination control module 325 can also control the spectrum with which illumination module illuminates a subject. The configuration, capabilities and functionality of illumination control module 325 are discussed in greater detail below in reference to the use and operation of illumination module 375.

Calibration Control Module

In some embodiments, calibration module 330 is separate and distinct from application module 315. In other embodiments, calibration module 330 can be included in the same sub module as application module 315. Calibration module 330 can be any type of computer readable medium that can either be programmed at the time of manufacture of control module 105 or programmable in the field by a user or technician. In embodiments in which calibration module is a field programmable module it can be an EEPROM or other user programmable computer readable medium which can have one more calibration tables determined by a calibration application in application module 315 or in calibration module 330 executed by a processor. As previously mentioned, any application in application module 315 can be run by either a separate general-purpose computer or a processor on control module 310. The same is true for any application in calibration module 330.

In various embodiments, the calibration module can be adapted to read each calibration table from each module in the modular microscope and perform a calibration routine to calibrate the modular microscope as a whole unit. In other embodiments, the calibration module can read the calibration table and the calibration routine from any or all individual modules in the modular microscope and run the routines for each module individually or in conjunction with another module in the modular microscope. In such embodiments, a new calibration table can be written to a memory in either the calibration module or elsewhere with a new unique identifier to identify the combination of modules used in the calibration. In some embodiments, each module of the modular microscope can have a identifier. Such identifiers can be used to match modules to corresponding calibration tables stored in one or more modules of the modular microscope or online at a manufacturer's or reseller's website so as to provide users with a place to retrieve lost or erased identifiers. In other embodiments, the identifier of each module in the modular microscope can be used to create a identifier for a particular configuration of modules in the modular microscope. Such a composite identifier can be used to identify composite calibration tables or images captured with the particular configuration of modules.

Imager Communication Module

Control module 105 can have an imager communication module 335. Imager control module 335 can have imager module specific drivers and controllers to run an imager module 365. In various embodiments, imager communication module facilitates communication between one or more sub modules on control module 105 and imager module 365.

Power Module

Control module 105 can also include a power module 340 which can provide power to control module 105, imager module 365, lens module 370 and illumination module 375. In other embodiments, imager module 365, lens module 370 and illumination module 375 can each have their own power module. In some embodiments, power module 340 serves as an AC-DC converter that can allow control module 105 to operate on either AC power or DC power. In various other embodiments, power module can condition the power coming from an external power supply to an appropriate voltage or current level. Such embodiments, power conditioning can be useful for reducing or illuminating power source noise in the imager device on a major module 365.

Communication Module

Control module 105 can include a communication module 345. Communication module 345 can communicate with imager module 365. In various other embodiments, communication module 345 can be configured to communicate with an external general use computer. Communication module 345 can communicate with an external general use computer via a parallel, serial, USB, FireWire or other suitable communication protocol. In such embodiments, communication module 345 can be used to communicate an identifier contained in security module 310 to an external general use computer over the communication protocol to verify the identity of the particular modular microscope system. The identifier can be used by the general use computer to verify to an application resident in application module 315 that the user has the authority to use, or view or manipulate images that might be stored on the external general use computer with programs residents in application module 315. In such embodiments, the unique identifier can be encoded in those images to prevent others who are not in possession of a particular modular microscope system from using, viewing or manipulating images captured by the particular modular microscope system. This can act as both a security feature for the end user as well as means for controlling how and by what means and programs the modular microscope system can be used under a license from the manufacturer or reseller.

Driver Module

Control module 105 can have a driver module 360. Driver module 360 can have a plurality of drivers used to instruct communication module 345 how to communicate with various other modules of the modular microscope system. In some embodiments, driver module 360 can contain drivers for all modules designed to function with control module 105. In some embodiments, driver module can be a ROM while in other embodiments driver module can be an EEPROM so that drivers for new modules can be added to it in the field. In various embodiments, driver module 360 can contain drivers for imager module 365, lens module 370 or illumination module 375.

Imager Module

Control sub module B 110 can be an imager module 365, as shown in FIG. 3, and can include a digital imager chip. In such embodiments, the digital imager chip can be a CCD device or a CMOS device. One of ordinary skill in the art will recognize that any suitable imaging device could be used without departing from the spirit or scope of the present invention. In some embodiments, imager module 365 can include power and driver circuitry for powering and controlling the imaging device. In some embodiments, it is advantageous for a physical imager module 365 to be coupled to or mounted on a physical control module 105. This can be achieved if both the control module 105 and the imager module 365 are printed circuit boards with appropriate connectors or sockets or other mechanical coupling or mounting apparatus.

In various embodiments, the mechanical coupling or mounting apparatus can include an electrical signal communication coupler to provide electronic communication between the imager module 365 and the control module 105. In such embodiments, when imager module 365 is mechanically connected to control module 105, it is also communicatively connected to control module 105. Alternatively, power and control signals can be supplied to imager module 365 over separate connections. One of ordinary skill in the art will realize the various connections can be utilized to connect communicatively control module 105 to imager module 365. For example, the connection can be an RS-232, USB, serial or parallel connection. However, these examples are not exhaustive and should not be interpreted to limit the scope of the invention.

Lens and Focusing Modules

In various embodiments, lens module 125 can be coupled and aligned to illumination module 140. In some embodiments, focusing module 145 can be included in lens module 125. In other embodiments, focusing module 145 can be included in the illumination module 140. Focusing module can include various mechanisms to vary the position of lens module and the optical elements included therein with respect to the imaging device 115 and illumination module 140. For example, focusing module 145 can use incline planes, mechanical gears or groves to facilitate movement of the various module relative to on another. Focusing module 145 can be equipped with a powered focusing motor or servo 135. Focusing motor or servo 135 can be controlled and powered by a signal relayed from control module 100 through lens module 125. Alternatively, focusing motor or servo 135 can be controlled and powered by connections external to lens module 125.

Alternatively lens module 370 can include integrated powered focus motors or servos and mechanisms. In such embodiments, the power to focus motors or servos can be powered and controlled by either control module 105 or imager module 365 or a combination thereof. In some embodiments, the power and control signals delivered to lens module 370 can be delivered through the lens mount or other coupler connecting imager module 365 to lens module 370.

In various embodiments, lens module 370 can include one or more optical elements. In such embodiments, various lens configurations and combinations can be designed to deliver various levels of magnification and depth of field. One of ordinary skill in the art will realize that many different lens designs and configurations can be used to achieve desirable results without deviating from the spirit and scope of the present invention.

In various embodiments, lens module 370 can be mechanically and communicatively coupled to illumination module 375. In some embodiments, lens module 370 can relay power and control signals from control module 105 or imager module 365 to illumination module 375. Mechanical coupling means to connect lens module 370 to illumination module 375 can be similar to that used to couple imager module 365 to lens module 370. In other embodiments of the present invention, illumination module 375 can be powered and controlled with connections separate from lens module 370.

In various embodiments, illumination module 375 can include focusing and positioning motors or servos. The focusing and positioning motors and servos can be controlled by control module 105, imager module 365 or a combination thereof. Various other embodiments of the focusing motors or servos on lens module 370 can work in conjunction with focusing and positioning motors and servos on illumination module 375. In such embodiments, it is possible to control not only the back focal plane location but also the position of the subject under examination relative to the illumination sources on illumination module 375. In various embodiments, the platform on which the subject under examination sits can be adjusted in three dimensions so that any portion of the subject can be imaged through lens module 370 onto the imaging device on imager module 365. Various aspects of illumination module 375 are discussed in greater detail below in reference to embodiments of using the illumination module 375 depicted in FIG. 5 directed specifically toward features, components and uses of illumination module 375.

Method of Use and Operation

Figure 4:
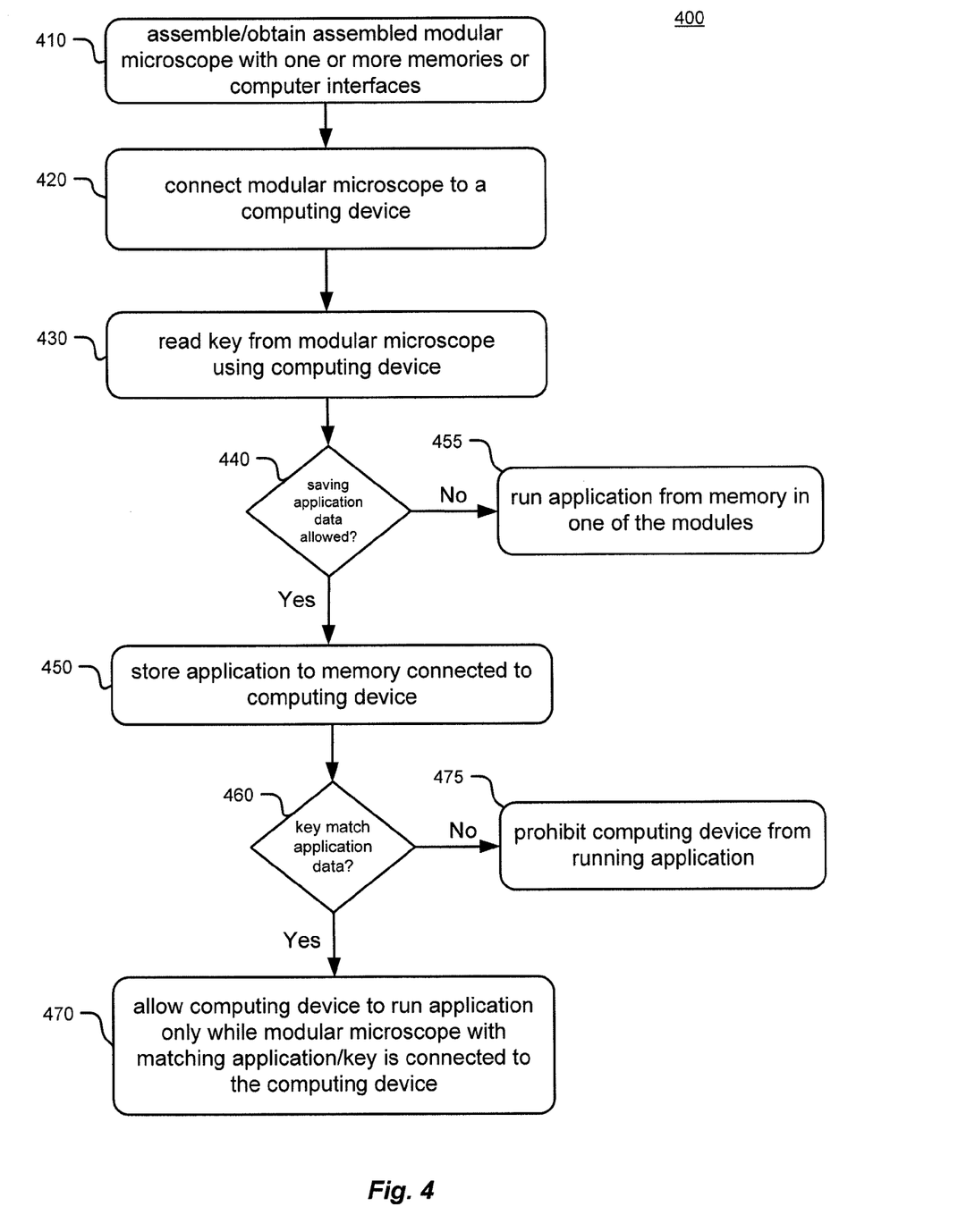
FIG. 4 is a flowchart of a method for using a modular microscope with security or digital right management according to one embodiment of the present invention.

Various embodiments are directed towards the use of the modular microscope described herein. For example, FIG. 4 shows a method 400 of using a modular microscope according to various embodiments of the present invention. At step 410 a user can assemble or obtain and assembled modular microscope having one or more microscope modules with memory and/or computer interface. Once the modular microscope is either fully or partially assembled, it can be connected to a computer device using one or more computer interfaces. In some embodiments, the modular microscope can be powered through the computer interface, while in other embodiments, the modular microscope can be powered by an external power source.

In step 430, the computing device connected to the modular microscope, such as a general use computer, can read a key from one or more memories in the modular microscope. This key can include an encryption key as well as other identifying information associated with the particular configuration of the modular microscope. The identifying information can include one or more microscope module identifiers either in a string of identifiers, the results of a formula applied to the string of identifiers, such as a hash function, or a list the identifiers associated with the control module. In embodiments in which calibration information or the key is generated using identifiers or characteristic calibration data from each of the constituent microscope modules, each different configuration of the modular microscope possible with the microscope modules available to a user can generate a different and or unique key. These different and/or unique keys can be selectively paired with or associated with some or all of the application software stored in the control module or any other module of the microscope.

In some embodiments, the key stored on one or more the modules of the modular microscope can include a flag to indicate whether or not saving of application data is permitted. The determination of the flag indicating whether or not saving application data is permitted occurs at step 440. If saving application data is not permitted, then the general use computer connected to the modular microscope can simply run the application from the memory of one of the microscope modules in step 455. According to some embodiments, this is a form of securing the software included with the control module or particular modular microscope.

In other embodiments, a computing device, such as a general use computer, can actually save the application data stored on one or more of the microscope modules of the modular microscope or one an external memory such as an CD, DVD or other memory device, to a local memory in step 450. In certain circumstances, such as if the application is relatively large or complex, is advantageous to allow a computing device to store the application data in a high-speed memory cache or other memory. However, to restrict or prohibit unauthorized use, access or distribution of the application data, the stored application data can require that a modular microscope with a key associated or paired with the application data be connected to the computing device prior to allowing the application data to be executed or otherwise used.

In step 460, the application data can be executed in a limited manner to check for an authorized, paired or associated key stored on a connected modular microscope. If no authorized key is available on a connected modular microscope, then the application will not execute at all or only allow users limited access to various functions of the application data in step 475. If, however, the computing device detects an authorized, paired or associated key from a connected modular microscope, then the application data will be allowed to be fully executed and run the application only while modular microscope with a matching key is connected to the computing device in step 470.

Illumination Module: Features, Advantages and Methods of Use

Aspects, of the illumination module will now be discussed in reference to FIGS. 1 3, and 5. For example, one embodiment shown in FIG. 1, shows that illumination module 140 can include platform 170 mounted on support structure 175. In some embodiments platform 170 can be a printed circuit board (PCB). In some embodiments, illumination sources 160 and 150 are mounted to platform 170. In various embodiments of the present convention, illumination sources 160 and 150 are powered and controlled by signals relayed from control module 100 through lens module 125. The calibration table can include calibration data correlating input voltages currents required by illumination module 140 to produce a desired illumination output level from illumination sources 160 and 150. In some embodiments, the calibration data from the calibration table can be communicated to either a processor in control module 100 or an external general use computer.

Similarly, illumination module 375 shown in Fig. can include a memory containing a calibration table that can be communicated to control module 105 or imager module 365 so that the illumination sources 380 and 385 on illumination module 375 can be driven with appropriate voltages or currents to provide a known and predictable illumination output. In some embodiments, lens module 370 can also have a memory containing a calibration or aberration table that can be communicated to control module 105 or imager module 365 so that aberrations, defects or other particularities associated with lens module 370 can be corrected for during any imaging processing performed on images captured with the modular microscope system.

In various other embodiments, imager module 365 can include a memory that also contains a calibration, compensation or defect table. The calibration, compensation or defect table on imager module 365 can be used to calibrate or compensate for color, light sensitivity, drift, pixel defects and other idiosyncratic characteristics of the imaging device on imager module 365. As described, the calibration, compensation or defect table included in imager module 365, lens module 370, or illumination module 375, can be communicated to control module 105 to be used in any image processing of images captured with the modular microscope system. The compensation tables of the individual modules can be used to create a composite calibration table or used to run a calibration routine for the modular microscope.

In some embodiments, illumination module 140 can include a stage for mounting a subject object or specimen to be imaged by the modular microscope. This stage can be a traditional microscope slide holder can also be customized to hold any suitable size sample container or vessel to hold a subject object. In other embodiments, illumination module 140 can include powered motors or servos to move and arrange the subject object. In such embodiments, the powered motors or servos used to move and arrange the subject object can be controlled by either control module 105 or a external general use computer. In other embodiments, focusing module can include the stage for mounting a subject object to be imaged by the modular microscope.

In various embodiments, illumination sources 160 and 380 can be LEDs. In some embodiments, illumination sources 160 and 380 can be surface mounted LEDs. In various embodiments, illumination source 150 and 385 can also be LEDs. In other embodiments, illumination sources can include conventional incandescent or florescent illumination sources that can be shaped or directed using appropriate optics.

The illumination sources 160 and 385 can be configured to provide dark field illumination of the subject object under investigation. In such embodiments, either the central cone of light can be directed to miss the acceptance angle of the lenses and lens module 125 or the penumbra of light spilling off of the central cone of illumination can be used to provide dark field illumination. In some embodiments, it is possible to use LEDs 380 positioned around the perimeter of illumination module 375 as dark field illuminators. In some embodiments, the LEDs can have a narrow cone of illumination ranging from a tight 5° cone angle to a wide 45° count angle. In embodiments in which narrower cone angles are used, the LEDs can be directed such that the central portion of the cone angle misses the front aperture of lens module 370 but also crossing through lens module 370s field of view. In other embodiments in which wider cone angles are used, the LEDs can be surface mounted and directed perpendicularly to the surface of the printed circuit board on which they are mounted in the illumination module 375, and the periphery illumination off-axis from the central cone angle of illumination can be used to provide dark field illumination.

In various other embodiments, illumination sources 150 and 385 can be arranged to be on axis with the lenses of lens module 125 and 370, respectively, to provide a bright field and back illumination. In such embodiments, it is often desirable to use diffuse or polarized illumination. To achieve such illumination, a diffuser or a polarizer can be fitted to illumination sources 150 and 385. The diffuser can be any suitable diffuser such as a ground glass diffuser, a smoked acrylic diffuser or combination thereof. In various embodiments, a controlled angle diffuser is desirable to control the direction of the light diffused through the diffuser. In other embodiments, linear or circularly polarized light is desirable. In such embodiments, the on-axis LED 385 can be fitted with a suitable polarizer or quarter-wave plate. In some embodiments, it is advantageous to select LEDs or other illumination sources with the wavelengths of illumination such that both bright field and dark field illumination can be operated simultaneously without interfering with one another.

One specific advantage of using the illumination module 140 or 380 is that a user can specify and change between dark field or bright field illumination or a combination of the two with no moving parts. The ability to change between the illumination styles with no moving parts means there is a switch between the lighting conditions with no physical vibrations to the illuminator module housing. Providing lighting for imaging a subject specimen with no physical vibrations is highly desirable for imaging specimens that are suspended in liquid or otherwise susceptible to physical vibrations which would prevent high quality microscopic imaging. For example, one possible implementation of the modular microscope according to various embodiments of the present invention can include counting animal or plant cells or other microscopic bodies that are suspended in a liquid, i.e. blood or micro cellular matter.

Furthermore the ability to change between dark field and light field illumination also provides greater flexibility in trying to image moving microscopic objects as they float within a three-dimensional region of the liquid in which there suspended. For example, as a three-dimensional blood cell drifts from the top to the bottom of the sample volume, it's orientation can change relative to the optical axis of the lens module, thus it is helpful to be able to change the lighting conditions from bright field information to dark the illumination and then back again to obtain the best lighting conditions for imaging the blood cell in the various orientations.

Figure 5:
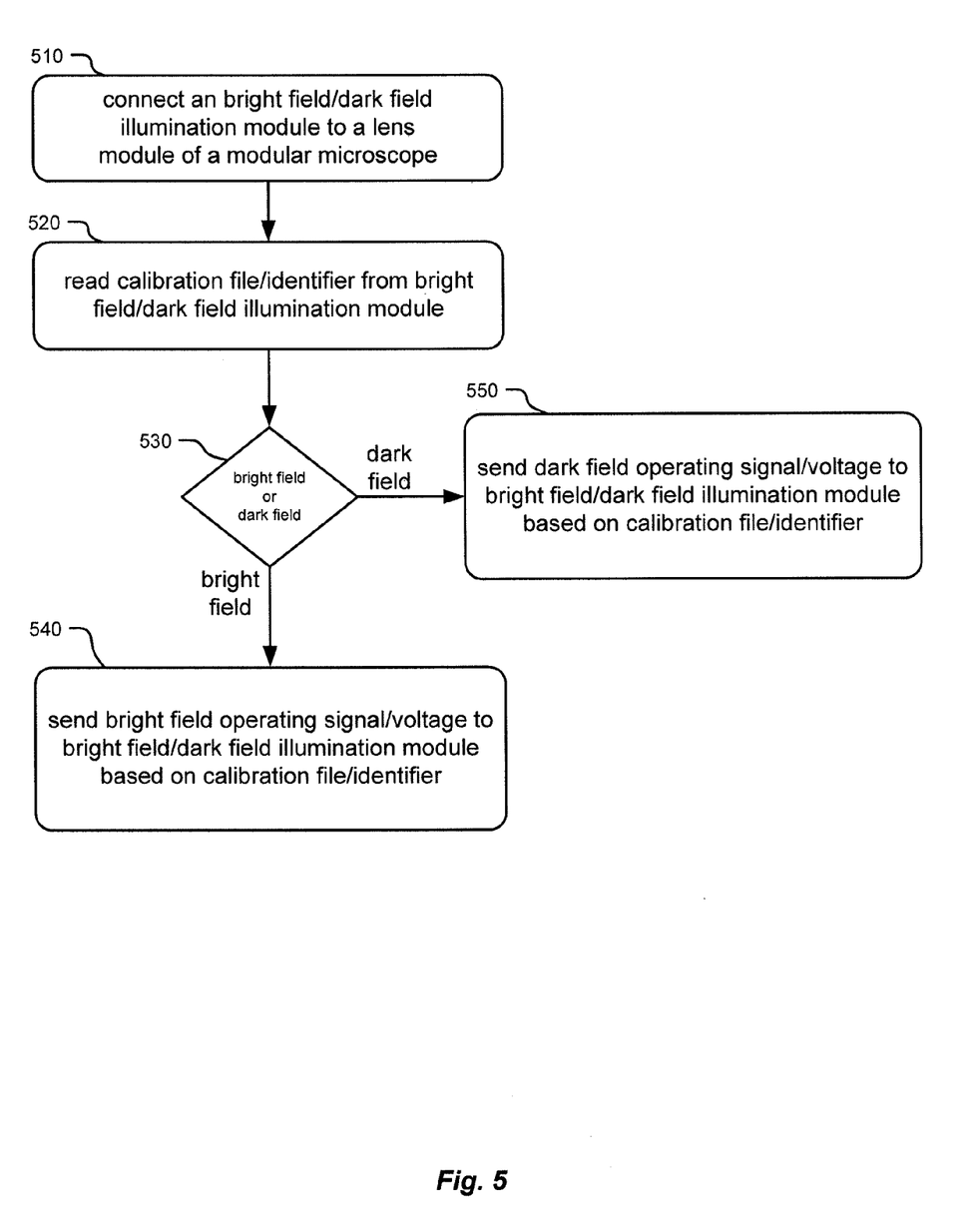
FIG. 5 is a flowchart of a method for using a bright field and dark field illuminator according to one embodiment of the present invention.

FIG. 5 is a flow chart depicting a method for using an illumination module having both bright field and dark field illumination capabilities, according to one embodiment of the present invention. At step 510, the illumination module is connected to the lens module of a modular microscope. Various embodiments of the present invention, the ability to select and change the illumination module attached to the front of the lens module to provide bright field and dark field illumination is advantageous in that it allows users to select bright field and dark field illumination modules having specific wavelength bands best suited for the samples that are to be imaged. For example, various fluorescent dyes can be added to samples, therefore it can be advantageous to choose animation module with light sources, i.e. LEDs, having an output in the near or far ultraviolet to induce fluorescence in the samples. Alternatively, certain microscopic bodies absorb specific bands of light, therefore selecting a specific band that causes those bodies to show up as dark regions in the resulting images can be helpful for automated counting purposes.

Next, in step 520 the calibration file or the identifier from the illumination module can be read by either the control module or an external computing device, such as a general use computer, through one or more of the computer interfaces of the modular microscope. As discussed above, the calibration or the identifier from the bright field/dark field illumination module gives the control module or other computing device the ability to specify calibrated light outputs from the light sources on the chosen illumination module.

In step 530, a user or automation software operating on a connected general use computer can choose to illuminate a specific sample with either bright field illumination or with dark field illumination. If dark field illumination is desired, the control module can send a dark field operating signal/voltage to the bright field/dark field illumination module based on the calibration files/identifier, in step 550. Alternatively, the control module can send a bright field operating signal/voltage to the bright field/dark field illumination module based on the calibration file/identifier at step 540.

In embodiments in which bright field illumination is desirable, a central LED or other suitable illumination source can be used to provide on-axis back lighting. Illumination source 385 can be positioned within a tube or other collimating device on illumination module 375 so as to collimate the backlight illuminating the subject under examination.

It should be understood that various embodiments, application, and routines of the present invention, as described above, can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Figure 6:
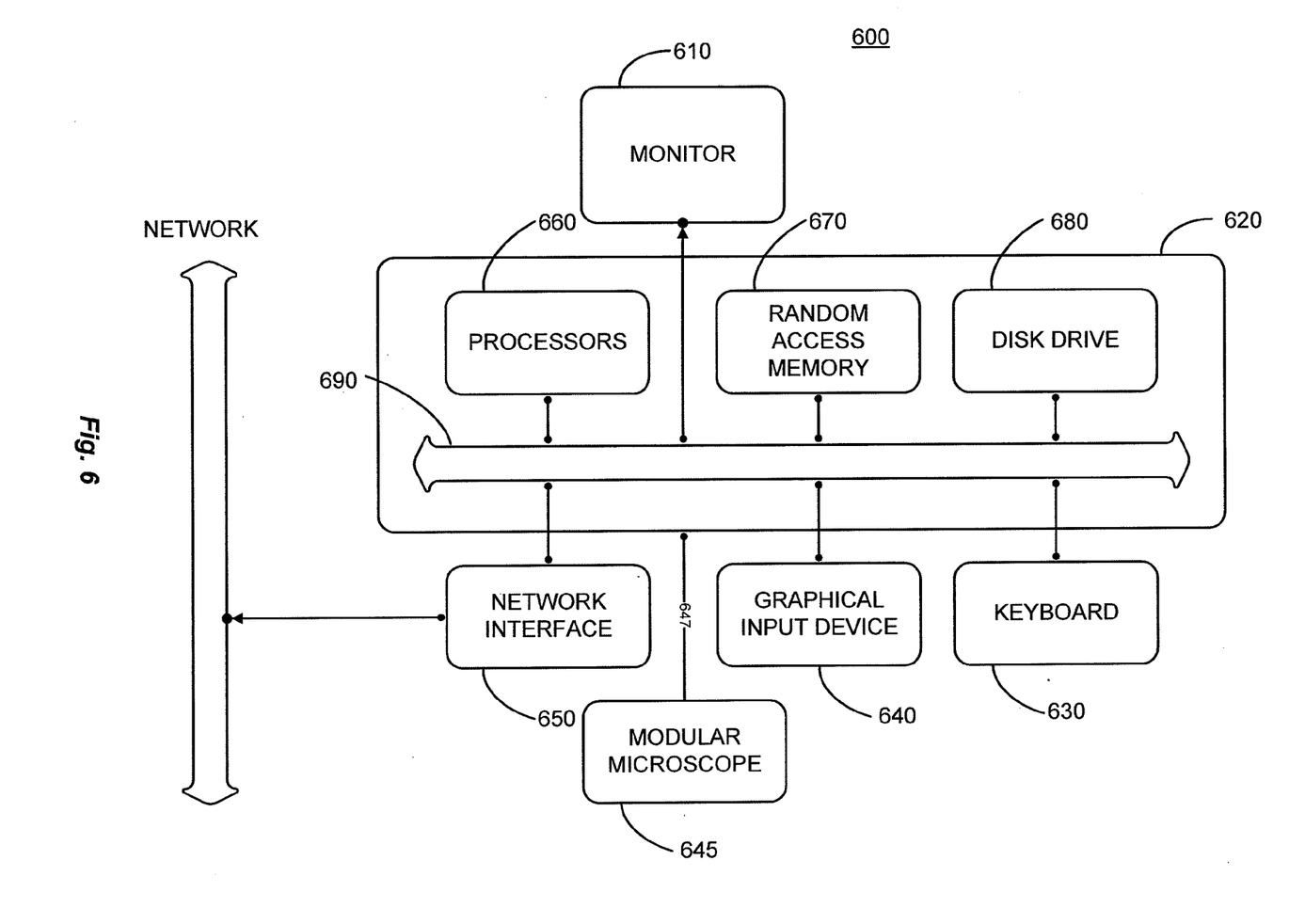
FIG. 6 is a block diagram of a computer system that be used to implement various embodiments of the present invention.

FIG. 6 is a block diagram of typical computer system 600 configured to execute computer readable code to implement various functions and steps according to various embodiments of the present invention.

System 600 is representative of a computer system capable of embodying the present invention. The computer system can be used as any one of the client computers or computing devices described herein. Additionally, a system 600, or one similar to system 600, can be included in one of the modules of the modular microscope to produce a complete stand alone modular microscope. This is becoming increasingly more desirable and available as computer system decrease in size and power consumption, while increasing in processing power. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 600 typically includes a display 610, computer 620, a keyboard 630, a user input device 640, computer interfaces 650, and the like. In various embodiments, display (monitor) 610 may be embodied as a CRT display, an LCD display, a plasma display, a direct-projection or rear-projection DLP, a microdisplay, or the like. In various embodiments, display 610 may be used to display user interfaces and rendered images.

In various embodiments, user input device 640 is typically embodied as a computer mouse, a trackball, a track pad, a joystick, wireless remote, drawing tablet, voice command system, and the like. User input device 640 typically allows a user to select objects, icons, text and the like that appear on the display 610 via a command such as a click of a button or the like. In embodiments in which the computer system 600 is external or separate from the modular microscope 645, the system 600 and the modular microscope can be connected over computer interface 647.

Embodiments of network interfaces 650 typically include an Ethernet card, a modem (telephone, satellite, cable, ISDN), (asynchronous) digital subscriber line (DSL) unit, FireWire interface, USB interface, and the like. For example, network interfaces 650 may be coupled to a computer network, to a FireWire bus, or the like. In other embodiments, network interfaces 650 may be physically integrated on the motherboard of computer 620, may be a software program, such as soft DSL, or the like.

RAM 670 and disk drive 680 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 620 typically includes familiar computer components such as a processor 660, and memory storage devices, such as a random access memory (RAM) 670, disk drives 680, and system bus 690 interconnecting the above components.

In some embodiments, computer 620 includes one or more Xeon microprocessors from Intel. Further, in the present embodiment, computer 620 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A system for operating a modular microscope comprising:
   a computer system; and
   a modular microscope comprising:
     a control module;
     an imager module;
     a lens module; and
     an illumination module,
   wherein the computer system is communicatively removably coupled to the modular microscope, and wherein at least one of the control module, the imager module, the lens module, and the illumination module comprises a security module that allows the computer system to run computer programs contained in the control module and view images captured with the modular microscope only when the computer system is communicatively coupled to the modular microscope.

2. The system for operating a modular microscope of claim 1 wherein at least one of the control module, the imager module, the lens module and the illumination module comprises a calibration table.

3. The system of claim 2 wherein the control module comprises a calibration module adapted to read or modify the calibration table in at least one of the control module, the imager module, the lens module and illumination module.

4. The system for operating a modular microscope of claim 1 wherein the security module is adapted to generate a security key used to restrict access to applications contained within the modules of the microscope.

5. The system for operating a modular microscope of claim 1 wherein the security module is adapted to generate a security key used to restrict access to the images captured by the modular microscope.

6. The system for operating a modular microscope of claim 1 wherein the security module generates a security key using results of a characterization routine that measures characteristics of the microscope module.

7. The system for operating a modular microscope of claim 6 wherein the security key is generated as a function of the results of the characterization routine.

8. The system for operating a modular microscope of claim 7 wherein the function of the results of the characterization routine is a hash function.

* * * * *